United States Patent [19]

van Gasteren et al.

[11] Patent Number: 5,159,552

[45] Date of Patent: Oct. 27, 1992

[54] METHOD FOR CHECKING THE CORRECT AND CONSISTENT USE OF UNITS OR CHEMICAL FORMULAE IN A TEXT PROCESSING SYSTEM

[75] Inventors: Theodrikus H. I. E. van Gasteren, Kronenberg; Petrus A. M. Cornelissen, Venlo, both of Netherlands

[73] Assignee: Oce-Nederland B.V., Venlo, Netherlands

[21] Appl. No.: 586,381

[22] Filed: Sep. 20, 1990

Related U.S. Application Data

[63] Continuation of Ser. No. 182,444, Apr. 18, 1988, abandoned.

[30] Foreign Application Priority Data

Apr. 23, 1987 [EP] European Pat. Off. ........ 87200768.7

[51] Int. Cl.$^5$ .............................................. G06F 15/38
[52] U.S. Cl. ..................................... 364/419; 395/146
[58] Field of Search ................. 364/415; 395/146, 148

[56] References Cited

U.S. PATENT DOCUMENTS

| | | | |
|---|---|---|---|
| 4,342,085 | 7/1982 | Glickman et al. | 364/200 |
| 4,479,194 | 10/1984 | Fogg et al. | 364/900 |
| 4,604,710 | 10/1986 | Amezcua et al. | 364/900 |
| 4,672,571 | 6/1987 | Bass et al. | 364/900 |
| 4,674,065 | 6/1987 | Lange et al. | 364/900 |
| 4,686,649 | 10/1987 | Rush et al. | 364/900 |
| 4,751,740 | 6/1988 | Wright | 364/900 |
| 4,773,009 | 9/1988 | Kucera et al. | 364/419 |
| 4,777,617 | 10/1988 | Frisch et al. | 364/900 |
| 4,783,759 | 11/1988 | Borgendale et al. | 364/900 |
| 4,783,760 | 11/1988 | Carosso | 364/900 |
| 4,843,389 | 6/1989 | Lisle et al. | 364/900 |
| 4,864,502 | 9/1989 | Kucera et al. | 364/900 |

FOREIGN PATENT DOCUMENTS

0093249  3/1983  France .
2136612  3/1983  United Kingdom .
0109581 10/1983  United Kingdom .

Primary Examiner—Gail O. Hayes
Attorney, Agent, or Firm—Reed Smith Shaw & McClay

[57] ABSTRACT

A method for checking in a text processing system the correct and consistent use of units, comprising the steps of: storing a list of symbols or production rules that represent units; storing criteria, that state whether or not a symbol or a combination of symbols is interpreted as a unit; specifying allowable units and allowable notations thereof; searching the text for references to units, i.e., for strings that can be interpreted as a unit or part of a unit; checking whether the strings represent an allowable notation of an allowable unit; and generating an error signal, if not. If an unallowable unit is found, this unit and the associated number(s) may be transformed into an allowable unit.

22 Claims, 2 Drawing Sheets

METHOD FOR CHECKING THE CORRECT AND CONSISTENT USE OF UNITS OR CHEMICAL FORMULAE IN A TEXT PROCESSING SYSTEM

"This is a continuation of copending application(s) Ser. No. 07/182,444 filed on Apr. 18, 1988 now abandoned."

FIELD OF THE INVENTION

The present invention relates to the field of automatic text processing. In particular, the invention relates to a text processing system and methods of automatically detecting specific types of errors that violate certain rules relating to the use of units or chemical formulae.

BACKGROUND OF THE INVENTION

Various types of text processing methods are known. In some conventional text processing systems, it is possible to detect spelling errors by means of a so called spelling processor. The spelling processor checks each word of the text against a dictionary, see, e.g., U.S. Pat. No. 4,342,085. If a word of the text cannot be matched to any word of the dictionary, it is concluded that this word is misspelled. Some spelling processors are even capable of automatically correcting a spelling error by replacing the misspelled word by a word from the dictionary. In order to identify the correct word in the dictionary, sophisticated computing methods have been developed, that are based on an analysis of similarities between the words, and/or on a statistical approach considering the different frequencies of occurrence of certain types of spelling errors, or even on an analysis of the context of the misspelled work, exploiting the redundance of the text, e.g., European Patent Application No. 0093249 A3, UK Patent Application GB 2136612A.

However, in connection with the use of units and magnitudes, for example in a scientific text, a number of specific problems and, accordingly, a number of specific errors and mistakes are frequently encountered, that cannot be handled by a conventional spelling processor.

-II-

A "magnitude" is defined to be a concept or a feature of an object that can be quantitatively described. Such a quantitative description is the result of determining the ratio between the magnitude and a certain reference magnitude. The reference magnitude is called a. "unit", and the ratio is called the "numeric value" of the magnitude.

Magnitudes can be grouped in sorts of magnitudes. Two different magnitudes are defined to be of the same sort, if they can be compared to each other, that is, if they can be compared to the same unit. The product or the quotient of two magnitudes of the same sort or different sorts gives a new magnitude of another sort. Thus, there exist many mathematical relations between different sorts of magnitudes and between the associated units. Within a specific application area, it is possible to specify a set of basic magnitudes in such a way that all magnitudes occurring in this application area can be written as a product that consists of basic magnitudes with certain positive or negative powers. This product (or the set of the powers of each basic magnitude in this product) is called the dimension of the magnitude.

A system of units is established by specifying basic units for the basic magnitudes, and the dimension of a unit is understood to be the dimension of the associated sort of magnitude.

If, as an example for illustrating the definitions give above, the magnitude of force 5 N (5 Newton)

is regarded, the sort of magnitude is "force", the numerical value is 5, the unit is Newton and the dimension of the unit is $kg.ms^{-2}$, wherein kg, m and s are the basic SI-units for mass, length and time.

Although, the above example was taken from the field of science, it should be noted that the concept of units and the applicability of the present invention is not limited to the area of science. The ideas of the present invention may be applied in any application area where quantitative descriptions are used, for example, in the area of finance (currency units), cook books, stock or inventory administration (number of articles per box) and so on.

In a given application area, there generally exists a plurality of different systems of units, and each sort of magnitude may be described by a large variety of different units. The use of units and systems of units is governed by various standards. While some of these standards are only applicable in certain geographical regions or certain application areas, other standards, such as the SI-standard are based on an international convention and have a large field of applicability. The use of the SI-standard is prescribed by many national and international authorities. According to this standard, several old units are forbidden and some are only allowed in specific scientific disciplines. However, many units or systems of units that are forbidden according to the SI-standard are nevertheless frequently used in practice.

Consequently, if the use of a certain standard is prescribed for a text, there may occur many mistakes that consist in the use of a forbidden unit, while the spelling of the name or the symbol of the unit may be correct. If a magnitude, that has been described by means of a forbidden unit, is to be expressed in an allowable unit, it is generally necessary to change the numerical value (or values) in accordance with a certain conversion formula.

Another important kind of mistake relates to the notation of the units which must also be consistent with the given standard. In contrast to an ordinary word, an individual unit may be designated in various different ways. The basic units and some derived units can be designated either by a special name or by a special symbol. The derived units can further be described by various combinations of names or symbols. In case of a combination of symbols, the layout may be varied as well.

For example, the following expressions all designate the same unit, i.e., the unit "watt".

| | |
|---|---|
| (a) | W |
| (b) | $Js^{-1}$ |
| (c) | $J\ s^{-1}$ |

(Note that (b) and (c) are not automatically recognized as identical in a text processing system !)

|     |                |
| --- | -------------- |
| (d) | J/s            |
| (e) | N.m/s          |
| (f) | $m^2 kg\ s^{-3}$ |
| (g) | watt           |
| (h) | joule per second |

In general, only some of the possible notations are allowable or convenient, according to the given standard. Furthermore, the rules for determining the layout should be consistent throughout the text. Sometimes, even ambiguities in the notation have to be solved (for example: kg/(ha.yr) instead of kg/ha/yr).

Another specific kind of mistake relates to the use of prefixes such as "m" for "milli", "k" for "kilo", and the like. For example, the occurrence of more than one prefix in connection with the same symbol must be avoided, and the use of prefixes should be adapted to the scale of the numeric value, so as to avoid clumsy expressions like 0.0001 km.

In some cases, the dimension of a unit used in the text is not consistent with the magnitude that is to be described, or the dimension does not exist in the application area.

Another example of mistakes that occur in connection with units is the mixture of symbols for designating the unit with the name of the object that is to be measured (for example: "kg dry matter per ha"). In order to remedy these mistakes, it is generally necessary to change the complete sentence.

If mistakes of the types exemplified above are to be detected and corrected in a document, the text has to be reviewed by the editor or the author. This is a time consuming and cumbersome occupation.

It is therefore a first object of the invention to provide a text processing system and methods of automatically detecting at least the most frequent of the mistakes.

SUMMARY OF THE INVENTION

Generally, the present invention provides a method for use in a text processing system of checking the correct and consistent usage of units. The method includes the steps of:

(a) storing a list of symbols or a set of production rules that represent units;

(b) storing criteria that determines whether a symbol or combination of symbols is interpreted as a unit;

(c) specifying allowable units and their associated notations;

(d) searching in accordance with the criteria stored in the system, the text for strings that include any listed symbols;

(e) comparing, if such string is found, the related unit and the complete notation thereof to the units and notations specified in step (c); and (f) generating an error signal if the unit found is not allowable.

The steps (a) to (c) are preparatory steps in that they have to be executed before a text or a number of texts can be checked in the text processing system. Further, the information that is needed for finding the location of a reference to a unit in the text, for interpreting the reference and for identifying the unit is stored in steps (a) and (b).

In step (a), there is stored a list of symbols that can be used for designating a unit. If only the notation of units is to be checked, it is sufficient to store the symbols of allowable units. If forbidden units are to be eliminated from the text, the symbols of forbidden units are stored as well. Optionally, the full names of the units can be stored in addition to the symbols.

In general, additional information is required to reliably interpret references to units. For example, it may depend on the context whether a symbol actually stands for a unit or whether it is an ordinary word or part of an ordinary word. Furthermore, as a unit will frequently be designated by an expression that consists of several symbols or names of units, it is necessary to detect all symbols or names that belong to this expression and to analyze the relationship there between. The criteria for determining whether a symbol designates a unit—alone or in combination with other symbols—and for identifying the unit are stored in step (b). The selection of these criteria depends on the application area. However, it is possible to give some typical examples of useful criteria:

- It is possible to specify names or symbols that must always be interpreted as units, if they stand alone or are combined with a prefix.
- Units in formulae are often specified in a font that differs from the font that is used for the text.
- If a string, i.e., a sequence of characters between blanks, only consists of symbols for units and is not an ordinary word that may be found in a dictionary, it can be interpreted as the product of the units indicated by the individual symbols.
- Similarly, if individual symbols (which may be accompanied by an exponent) are separated by blanks, multiplying points ('.' or 'x') a slash ('/') or the like, or if names of units are separated by the words "times" or "per", the whole expression can be interpreted as a product or a quotient of the individual units.
- Further powerful interpretation criteria may be provided by the syntactical structure of the text. As is well known in the art, the syntactical structure of a sentence can be analyzed by means of a so called parser, that determines the constituents of a sentence and the syntactical category of the individual constituents. Because of the restraints on possible syntactical categories of a unit, it can be determined for many strings of the sentence that they must not be interpreted as a unit. On the other hand, a symbol or a combination of symbols can be positively identified with a unit, if it is syntactically related with a reference to a number (that indicates the numerical value of the magnitude) or with a catch-word that indicates the magnitude, directly. In most cases, the positions of references to magnitudes, numbers and units obey in a sentence to a comparatively simple pattern (for example: "A mass of 1 kg is subjected to a gravitational force between 9.79 and 9.82 N"). It is therefore possible to establish simple criteria (e.g., a number immediately preceding the symbol for the unit) that can be checked without consuming much computation time. On the other hand, if the full syntactical structure of a sentence is analyzed with a parser, it is possible to correctly interpret rather complex structures.
- For example, in the sentence: "Peak rates of evolution reach up to 0.012 in the autumn to only 0.002 kg N/ha/d in the winter". It will be recognized that the magnitude is the rate of evolution (of nitrogen (N)) and that the unit belonging to both the numbers 0.012 and 0.002 is kg/(ha.d).

In step (c) it is specified which units and notations of units are allowable. Preferably, these specifications are made consistent with one or more official or inofficial standards, and the corresponding information is stored in such a manner that, during normal operation, the user can only select between different standards but cannot change the provisions according to the standards.

In order to specify the allowable units, it is possible to store a list of symbols of the allowable units or to define a logical value for each of the symbols stored in step (a). Alternatively, all units as well as related information (allowability, possible notations, dimension, sort of magnitude and the like) may be stored in the text processing system in an internal representation. Furthermore, a set of rules may be stored for constructing allowable notations of derived units. Additional information that may be specified in step (c) relates to the use of prefixes and to the desired layout of designation of units. This information may be stored in such a manner that the user can freely select between different types of layout that are allowable according to the selected standard.

After the preparatory steps described above have been accomplished, a subject text is checked by executing steps (d) to (f) above.

In step (d), the text is searched for references to units, using the information stored in steps (a) and (b).

In a direct approach, this can be done by sequentially investigating each string of the text. This has the advantage that every reference to a unit is detected with certainty.

On the other hand, in many applications, it will be preferable to adopt an indirect approach.

According to an embodiment of the invention, the text is first searched for numbers (strings that only consist of digits), and only the strings immediately after a number are checked whether they can be interpreted as a unit. A statistical analysis has revealed, that, by this method, more than 95% of all references to units can be detected in an average text. As numbers can quite easily be detected in a text processing system, this indirect searching method leads to a drastic reduction of the processing time. In specific application areas, for example, in the area of finance, it may also be necessary to check the strings immediately before the number.

Alternatively, the text may first be searched for references to magnitudes by checking the strings against tables of keywords and symbols or production rules that refer to magnitudes. Then, only the strings in a predetermined environment of the magnitude need to be checked whether they designate units.

According to another indirect approach, the strings of the text are checked against a dictionary, and if a string is identified as a "normal" word, it is not attempted to interpret the string as a unit. This approach is particularly advantageous, if the method according to the invention is combined with the use of a conventional spelling processor. In this case, the dictionary of the spelling processor may be used, if special provisions are taken for those words of the dictionary that have the same spelling as a name or a symbol of a unit or a combination/composition of units.

If a reference to a unit has been localized and interpreted in step (d), it is checked in step (e), whether the unit and/or the notation thereof is allowable. This is generally done by checking whether the rules specified in step (c) are fulfilled. For example, it is at first checked to determine whether the unit that is designated by the strings found in step (d) has a dimension that actually appears in the application area (e.g., nature) and/or is consistent with the dimension of the magnitude to which it is related in the text. Then, a convenient allowable unit of the same dimension is selected, and an allowable notation thereof is constructed. Finally, it is checked whether the constructed notation is identical to that found in the text.

In case that the check in step (e) should fail, an error signal is generated in step (f).

In a preferred embodiment of the invention, only the forbidden units are stored in step (a). In this case, it will be specified in step (c) that all units are forbidden. Then, step (e) will be trivial, and the error signal will be generated as soon as a reference to a forbidden unit is detected in step (d).

The error signal may be indicated to the user, so that a necessary correction can be carried out.

Preferably, however, a proposed correction is also indicated to the user and/or carried out automatically. If the unit is replaced by another one, it is also checked, which number or numbers belong to this unit, and the numerical value of the magnitude is adapted in accordance with a predetermined conversion formula. If a syntax analysis has been carried out, the information obtained therein may be exploited for identifying the numbers that are associated with the unit.

In another embodiment of the invention wherein the units and numerical values are automatically converted, this embodiment is well suited for converting prices and the like from one currency unit to another. In such case, the currency units that are to be eliminated are specified as "forbidden units", while the currency unit into which the prices shall be converted is specified as the "allowable unit".

In yet another embodiment of the invention, a method for checking notations of chemical substances is provided. In this embodiment, for example, a bruto formula or a structure formula of a chemical substance can be regarded as an analogue to a unit, while the name of the chemical substance can be compared to the name of the sort of magnitude. The symbols for chemical elements correspond to the symbols for basic units. A construction rule for allowable formulae may be established by stating that in a formula for a molecule (not for an ion or a radical), the valences of the constituents must fit with each other.

The number of atoms of each chemical element in a molecule may be regarded as an analogy to the concept of dimension. Thus, it may be checked, whether, in a reaction equation, the sums of atoms on both sides of the equation are identical for each element. Similarly, if the chemical name of a substance is given in the text, the bruto formula can be checked against this name.

Further, it is possible to check the notation and layout of chemical formulae and to achieve a standardization of the chemical names. Other advantages of the invention will become apparent from a perusal of a detailed description of the presently preferred embodiments taken in connection with the accompanying drawings.

PRESENTLY PREFERRED EMBODIMENTS

Figure 1:
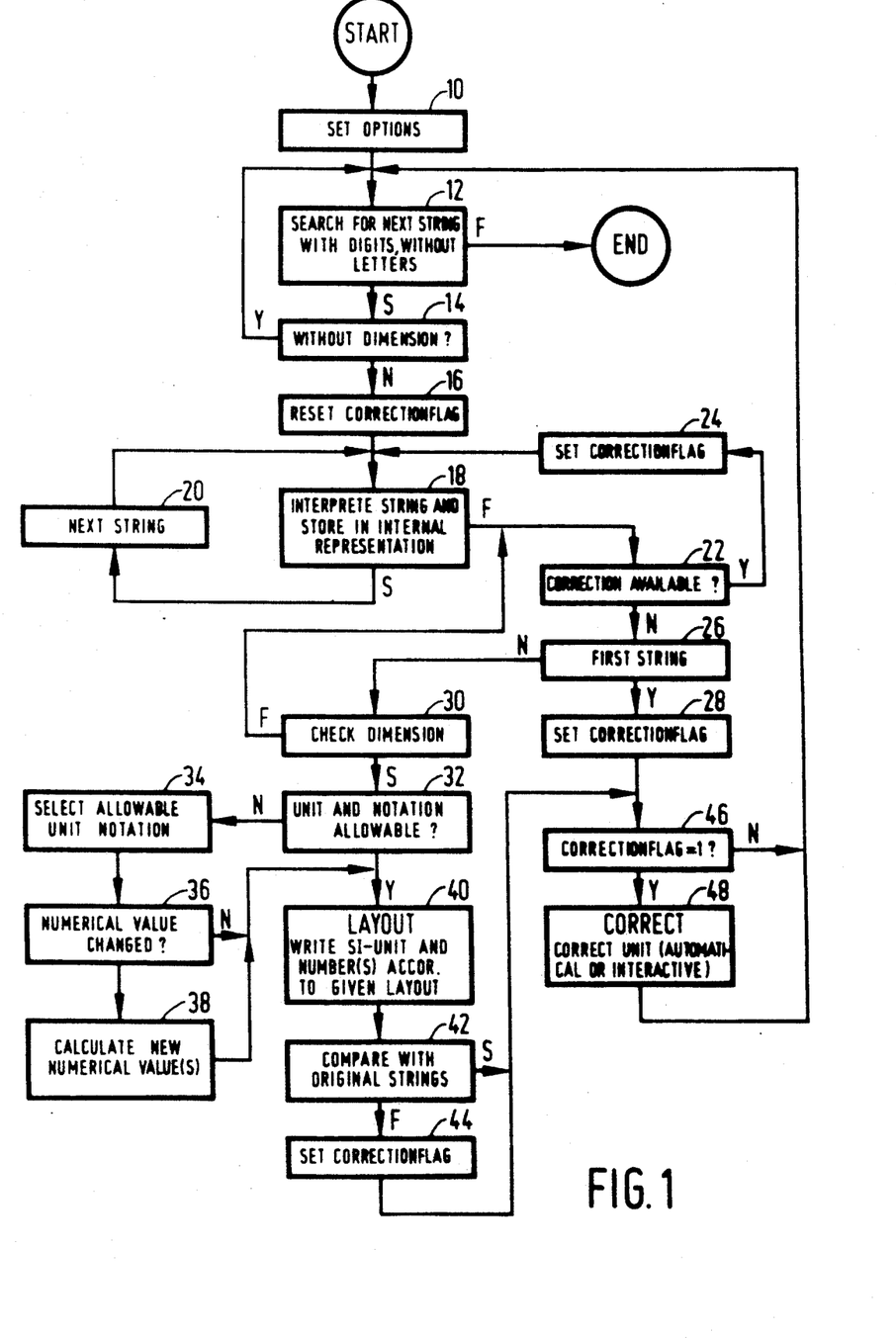
FIG. 1 is a flow diagram illustrating the method according to the invention.

Referring to FIG. 1, a flow chart illustrates a method for checking to determine whether the use of units and magnitudes in a text is consistent with the SIstandard.

In the following illustration, it is assumed that background information relating to symbols for units, allowable units, allowable dimensions, interpretation criteria, formulae for converting units, keywords, symbols and dimensions of magnitudes, and the like has been stored in advance.

1. Options

In step 10, a number of options are selected by the user. The available options relate for example, to the following:

1.1. The language of the document.

This information is needed for the interpretation of keywords and for handling peculiarities of the language, such as the notation of numbers. Further, the list of units may be shortened, because some forbidden units do not occur in certain languages.

1.2 Full names of units.

In most cases, a fully written unit must be replaced by its symbol. Sometimes, however, such a name is allowed (e.g., 5 years).

1.3. The layout of the units.

There are three ways of notating units. One of them has to be used consistently in the whole document.

1. A dot as a separator and a slash ("/")in the case of a division. Example: kg/(ha.yr).
2. A dot as separator and negative powers in case of a division. Example: $kg.ha^{-1}.yr^{-1}$.
3. A space separator and negative powers in case of a division. Example: $kg\ ha^{-1}\ yr^{-1}$.

1.4. The layout of the powers.

1.5. The notation of percentages.

The %-sign may be attached to the number or separated therefrom by a space. One of these modes has to be applied consistently in the document. When an error occurs, it is corrected without any mention.

2. Search for references to units

In order to find the location of a unit in the text, the text is first searched for numbers (steps 12 to 16), and afterwards, it is checked whether the next string or the next strings can be interpreted as units (steps 18 to 26).

2.1. Search for numbers.

In step 12, the individual strings of the text are scanned one by one, and it is checked whether a string represents a number. A string is supposed to represent a number when it contains digits, but no letters (for example: 1,735.8). A few exceptions (special letter sequences to represent special characters, according to the SGML-standard) are allowed.

In a modified embodiment, the concept of number is generalized, so that words or character sequences that refer to numbers or quantities, such as "five", "billion", "a dozen", "several" . . . are recognized as well.

In order to identify the value of the number (for possible conversions), the possibility must be considered that a number covers more than one string (e.g., 60,000). For this reason, it is checked whether the next string begins with a digit.

A specific problem in connection with determining the value of a number is the ambiguity in the notation of thousands and of decimals. In the English language, a comma is used as a separator for thousands (e.g., 100,000), and a point is used for decimals (e.g., 1.6). However, some authors use a point as a separator for thousands and a comma for decimals. In some languages, such as in German or Dutch, a space is used between thousands and a comma is used for decimals. However, even in these languages, a point is frequently used for decimals. In order to find the correct interpretation, individual or general instructions have to be given by the user. Alternatively, the complete text is scanned for numbers, and it is determined from a statistical analysis which notation has been adopted by the author. Standards for the layout of numbers are also available.

If the word "billion" is recognized as a reference to a number, the user has to specify whether it shall be interpreted as $10^9$ or $10^{12}$.

Very large or very small numbers are frequently written as a product of a decimal and a power of ten (e.g., $2.4 \times 10^5$). Such expressions are also recognized and interpreted as one number. Similarly, if the range of tolerance of a number is indicated by terms like "±5" or "(±5)", these terms are considered to belong to the preceding number.

After a complete number has been detected and identified, it is checked whether this number forms part of a group of numbers that belong together. To this end, the subsequent strings are investigated whether they designate numbers that are separated by commas, semicolons, hyphens or by keywords like "and", "or", "to" and so on. In the further steps of the procedure, the numbers of such a group are treated as an entity.

If a number (group of numbers) has been found, it is likely that the string immediately after this number will designate a unit. However, it is also possible that the number represents a dimensionless magnitude and is not accompanied by a unit. For this reason, it is tried in step 14 to classify the number as one without dimension.

To this aim, at least one of the following tests is carried out, and the number is ruled out as a dimensionless one, if at least one of the tests is successful.

It is checked whether the number is followed by the %-sign.

The string after and the string before the number are checked against a list containing all names of months, and the number itself is checked to represent a year. A number is supposed to represent a year when four digits, of which the first two are "19" are followed by right parenthesis or by ";" or ":".

The string before the number is checked against a list of keywords like "table", "figure", "category", and the like.

The string right after the number is checked against a dictionary so as to classify this string as a normal word. The dictionary is so designed that normal words which are spelled in the same way as a unit are omitted or specially marked.

If it is found that the number represents a magnitude without dimension, the search for numbers is continued with step 12. Otherwise, a correction flag is reset in step 16.

2.2. Interpretation of the strings immediately after the number.

When a number has been found in step 12, and the dimension test is positive, it is tried in step 18 to interpret the string immediately after this number as a unit.

To this end, the string is checked against a list of names and symbols for units. If the string is identical to a name or a symbol of a unit, it is interpreted as this unit, and the dimension of the unit is stored in a register. In some cases, the string as such may be ambiguous, so that it need not necessarily be interpreted as a unit. However, considering that the string appears immediately after a number, the interpretation of a unit is reasonable.

Similarly, if the string only consists of symbols for units that are separated by multiplying points, slashes or notations of powers, it is interpreted as a unit, and the dimension is determined from the dimensions and powers of the individual factors.

If the string could successfully be interpreted as a unit, the next string is investigated (step 20) and is subjected to the same interpretation procedure. In this way, units that extend over more than one string (e.g., "N m" or miles per hour") can be detected completely. The dimension of the complete unit is derived from the dimensions that have been assigned to the individual strings.

If a string cannot be interpreted as a unit in step 18, a correction procedure is applied to this string in step 22. The correction procedure substantially corresponds to that applied in conventional spelling processors. However, some special provisions are made in view of mistakes that typically occur in connection with the spelling of units. If a reasonable correction is available, the correction flag is set in step 24, and the interpretation procedure of step 18 is applied to the corrected string.

On the other hand, if a correction was not possible, it is checked in step 26 whether the string that could not be interpreted was the first string after the number. If it was not the first string, it is concluded that a complete notation of a unit has been found. If it was the first string, the correction flag is set in step 28, and the search for numbers is continued (step 12).

3. Check for allowability of the unit.

When a reference to a unit has been found, it is checked in step 30 whether the dimension of this unit, that has been determined during the interpretation procedure, can be found in a list of dimensions that actually appear in the application area. Additionally, the environment of the unit (e.g., the sentence in which the unit appears or a predetermined number of strings before and after the unit) is searched for keywords or symbols that refer to magnitudes. If such a keyword or symbol is found, the dimension of the magnitude is compared to the dimension of the detected unit. If the dimension of the unit does not appear in the application area or is not consistent with the dimension of the associated magnitude, it is again attempted to correct the strings that belong to the unit (step 22).

If the dimension check in step 30 was successful, it is tested in step 32 whether the unit and its notation are allowable according to the SI-standard. In this test, the following criteria are checked:

Are all symbols that appear in the unit allowable according to the SI-standard?

Is the notation as a product allowable or must some or all factors be replaced by special symbols (e.g., "W" instead of "J.s$^{-1}$")?

Is the use of prefixes in conformity with the SI-standard?

If at least one of these requirements is not fulfilled, a corresponding allowable unit or notation is selected in step 34. Then, it is checked in step 36 to determine whether the change of the unit or notation has an influence on the numerical value of the magnitude. If necessary, a new numerical value is calculated for each of the numbers that belong to the group detected in step 12.

The calculation of new numerical values is carried out in step 38. A set of conversion formulae that determine the relationship between the forbidden units and the allowable SI-units, are stored in a table. In general, the conversion simply consists in a multiplication with a given factor.

It is not necessary to store conversion factors for each possible pair of units. If the detected unit is a power of a forbidden unit or a product of powers of forbidden units, it can generally be replaced by a corresponding power or product of powers of allowable units. In this case, the conversion factors are taken to the same powers as the associated units, and the numerical value is multiplied by the product of the conversion factors. For example, the forbidden unit "pound-force per square inch" (lbf in$^{-2}$) is converted into the SI-unit "pascal" (Pa=N m$^{-2}$). The conversion factor for "lbf" into "N" is 4.448, and the conversion factor for "in" into "m" is 0.0254. Consequently, the total conversion factor is given by:

$$4.448 \cdot (0.0254)^{-2} = 6.8944, \text{ so that the magnitude "1 lbf in}^{-2}\text{" will be converted to "6.8944 Pa".}$$

In scientific literature, the number of digits behind the decimal point generally indicates the accuracy with which the corresponding magnitude is determined. For example, the notation "0.3 kg" indicates that the tolerance is in the order to 10 g, while the notation "0.300 kg" indicates that the tolerance is only in the order of a few tenth of a gram. Thus, strictly speaking, a conversion like $$0.1 \text{ lb} = 0.04536 \text{ kg}$$

is misleading, although the numerical value is correct. In this example, "0.1 lb" indicates a tolerance of ±0.05 lb which correspondence to about ±0.03 kg. Accordingly, the numerical value for kg should be rounded to 0.045. For this reason, the new numerical values that have been calculated in step 38 are rounded in such a way that the tolerance indicated by the last digit behind the decimal point corresponds to the tolerance indicated by the original number.

If the new numerical values calculated in step 38 have many zero-digits before or behind the decimal point, prefixes (for "milli", "kilo", "mega" and the like) are added to the unit or deleted therefrom in accordance with the SI-standard, and the numerical value is multiplied or divided by an appropriate power of ten.

Alternatively, it is prescribed that, for example, the unit "miles" is always replaced by "kilometre", while the unit "inch" is always replaced by "centimetre", so as to avoid large conversion factors. This method is particularly advantageous if indirect references to numbers are recognized in step 12. In this case, for example, "several inches" will be converted to "several centimetres" and not to "several meters".

4. Correction of layout

When the unit and its notation were found to be allowable in step 32 or when it was decided in step 36 that the numerical value(s) need not be changed, or when the new numerical values have been calculated in step 38, the SI-unit and the associated number are written in the allowable notation and in accordance with the preselected layout (step 40) and are compared with the original strings (step 42). If the new strings that have been written in step 40 are not identical with the original strings, a correction flag is set in step 44.

5. Correction

In step 46, it is detected, whether the correction flag has been set at any time during the procedure described above. If the correction flag has not been set, the search for numbers is continued directly with the next string of the text (step 12). In this case, the "next" string will be the string that could not be interpreted as a unit in step 18.

When a complete line of the text has been searched by repeating the steps 12 to 46, and when no correction has been necessary in this line, the line is displayed, for example, on a screen.

When a correction flag is detected in step 46, a correction procedure is carried out in step 48. Depending on an instruction of the user, the correction may be carried out automatically or by interaction with the user.

In case of interactive correction, the line in which the error has been detected is displayed to the user, and the strings that need to be corrected are highlighted. Additionally, the proposed correction, that is, the sequence of strings written in step 40, is displayed Then, it is decided by the user whether the original text shall be maintained without correction or whether the proposed correction shall be carried out, or the user may input a different correction.

The corrected text is saved in an output file.

In case of automatic correction, the correction pursuant to step 40 is automatically saved in the output file, and the old strings that have been deleted and the new strings that have been inserted therefor are marked by appropriate signs. If no correction is available, for example, if the dimension check in step 30 reveals that the unit is not found in the application area, even after all possibilities for corrections have been checked, and if the correct dimension cannot be determined from the context, no correction is carried out, and an error signal is displayed to the user.

In a modified embodiment of the correction process, the user has the possibility to specify certain types of errors that shall be corrected automatically, while other errors are corrected interactively. In an even more elaborated embodiment, a learning process may be installed so that, once the user has approved or commanded a certain correction, errors of the same type are automatically handled analogously to this correction.

Figure 2:
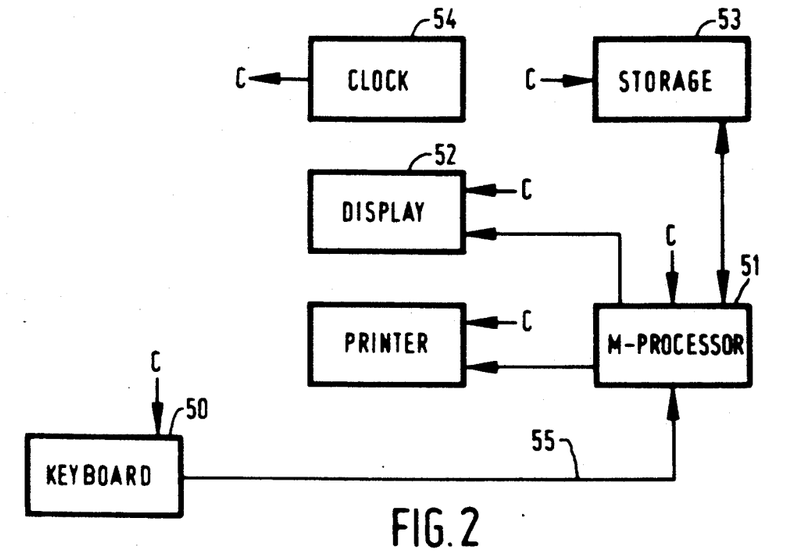
FIG. 2 is a block diagram of a text processing system according to the invention.
Figure 3:
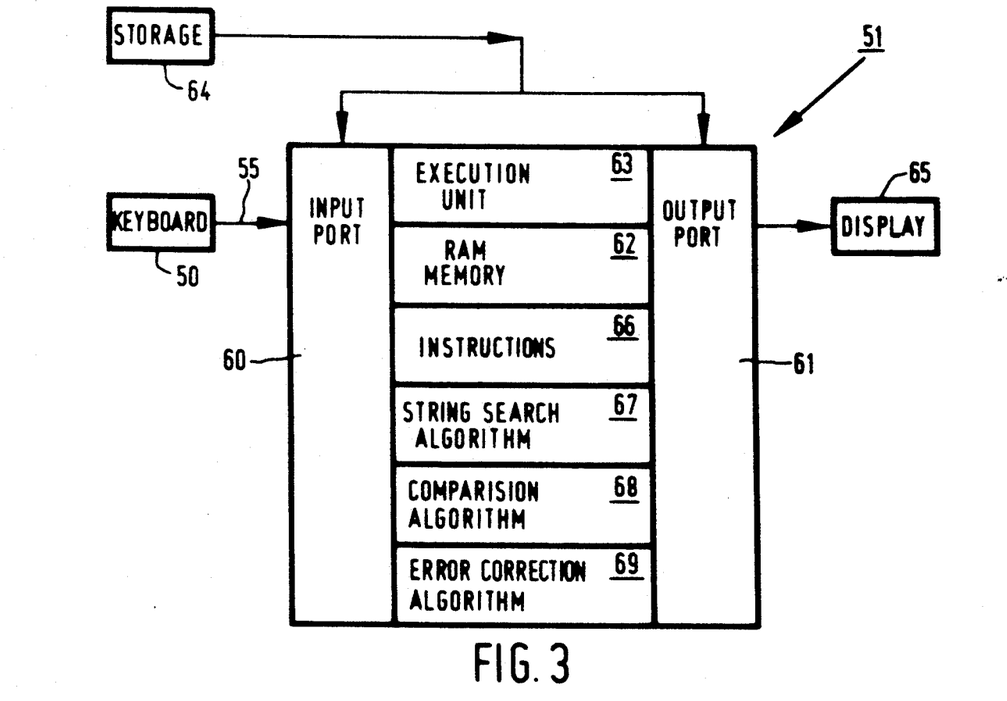
FIG. 3 is a functional diagram of the microprocessor shown in FIG. 2.

As shown in FIG. 2 the text processing system illustrated therein comprises a keyboard 50, a microprocessor 51, a display device 52 and an auxiliary direct access storage device 53 such as a disk or diskette drive. A synchronization unit 54 is also shown and is effectively coupled to each of the units. Keyboard 50 comprises a normal set of graphic symbol keys such as letters, numbers, punctuation marks, and special character keys, plus text format or control keys including carriage return, tab, index, etc. In addition, the keyboard 50 includes a second set of control keys for issuing special control commands to the system. The control keys include cursor movement keys, keys for setting the keyboard 50 into a number of different modes, etc. The keyboard 50 is connected to the microprocessor 51 by means of a bus 55. The microprocessor 51, as shown in FIG. 3, comprises an input port 60, an output port 61, a random access memory 62, and a process execution unit 63. Functionally, memory unit 62 stores both instructions and data in specified sections which will be described in more detail hereinafter.

Data is entered into memory 62 from the keyboard 50 as bytes of binary information through input port 60. The output port 61 also supplies data stored in memory 62 to a printer and display 65, and a disk storage unit 64, each of which may have their own internal buffers which are not shown. Commands to transfer data from the random access memory 62 to the printer or to the storage unit 64 are sent to the microprocessor 51 by the operator from the keyboard 50.

The printer may be any suitable printer known in the art. In most text processing systems, the printer is basically a standard input/output terminal printer having a type ball element or a daisy-wheel printer element or is a laser printer. Disk storage 64 may also by any suitable disk storage device which is capable of storing data supplied to it at determined sector address locations, each of which are randomly addressable by the microprocessor to retrieve the data. In the memory a number of routines and tables are stored. Data about symbols and a set of production rules that represent units and also criteria, such as typical features of the notation or of the context of units, are stored in the memory. Also a table of allowable units together with the allowable notation are stored. In addition, the microcomputer comprises instructions 66 and algorithms which are also stored in the memory 62. Some algorithmic routines used according to the invention are a string search algorithm 67, a comparison algorithm 68 and an error correction algorithm 69.

It will be understood that all of the above described functions and interactions involving the microprocessor are achieved through suitable programs and data which are also stored in memory 62 shown as memory blocks, 66, 67, 68, 62 and 69 of FIG. 3 and which are called into operation in response to data from the keyboard 50 or interrupt signals generated by the various components of the system shown in FIG. 2.

While presently preferred embodiments of the invention have been shown and described in particularity, it may be otherwise embodied within the scope of the appended claims.

What is claimed is:

1. In a text processing system including at least a central processor, a keyboard, a display and a memory wherein is stored:
   (a) a list of symbols or a set of rules that represent units, each of the units having a dimension to describe a quantitative magnitude;
   (b) criteria for determining whether or not a symbol or a combination of symbols is interpreted as a unit; and
   (c) allowable units and allowable notations thereof;
a method for checking the correct and consistent use of units for a dimensional description in a given text, comprising in combination the steps of:
   (1) searching the text for strings that include any of the listed symbols which are capable of being interpreted as a unit or part of a unit, pursuant to the stored criteria;
   (2) if such a string is found, comparing a unit associated with the found string and the complete notation thereof to the units and notations specified in (c); and (3) generating an error signal if the unit associated with the found string or the notation thereof is not allowable.

2. A method for checking the correct and consistent use of units of claim 1, wherein on the stored criteria in (b) a test is performed as to whether either a reference to a number or a keyword or symbol that refers to a magnitude is found in a predetermined environment of the string.

3. A method for checking the correct and consistent use of units of claim 1 or 2, wherein the syntactical structure of the text is analyzed, and wherein the stored criteria in (b) include features of typical syntactical structures in which the units appear.

4. A method for checking the correct and consistent use of units of claim 1 or 2, wherein allowable units are formed from rules for constructing possible mathematical expressions that are composed of such symbols for allowable units.

5. A method for checking the correct and consistent use of units of claim 4, wherein the dimension is calculated for each unit found in step 1, and wherein a unit is regarded as unallowable if its dimension does not appear in the application area or is different from the dimension of the magnitude that is indicated by a symbol or keyword to which the unit is related in the text.

6. A method for checking the correct and consistent use of units of any of the claims 1, 2, 3, 4 or 5, wherein, in step 1, the text is first searched for numbers, and the search for units is limited to the string immediately after a number or after a previously detected unit.

7. A method for checking the correct and consistent use of units of claim 1 or 2, wherein, in step 1, the strings are checked against a dictionary from which all words have been deleted that are spelled in the same way as a unit, and wherein a string is rejected without checking any further criteria, if it can be identified with a word of the dictionary.

8. A method for checking the correct and consistent use of units of claim 1 or 2, wherein a string that could not be interpreted as a unit in step 1 is subject to a spell checking and correction process and is compared against the interpretation criteria, after said spelling correction is carried out.

9. A method for checking the correct and consistent use of units of claim 1 or 2, wherein the memory includes a list of unallowable units together with a corresponding allowable units, and wherein, when a unit or a notation is found to be not allowable in step 2, the corresponding allowable unit and/or notation is determined.

10. A method for checking the correct and consistent use of units as set forth in claim 9, wherein the memory further includes conversion formulae for converting unallowable units into allowable units, the method comprising the steps of:

(i) identifying the numerical values of all numbers whether or not they are associated with a unit; and (ii) calculating new numerical values in accordance with the conversion formula for converting the unallowable unit to the corresponding allowable unit.

11. A method for checking the correct and consistent use of units as set forth in claim 10, wherein a number is defined to be associated with a unit if it immediately precedes the notation of the unit or if it is linked with another number associated with the unit only by punctuation marks or by words commonly used to link numbers associated with units.

12. A method for checking the correct and consistent use of units as set forth in claim 11, wherein the words commonly used to link numbers are selected from the group consisting of "and", "or" and "to".

13. A method for checking the correct and consistent use of units as set forth in claim 10, wherein a number belongs to the same syntactical group or is a constituent of a sentence.

14. A method for checking the correct and consistent use of units of claim 10, comprising the additional steps of:

(i) determining the tolerance due to a rounding error of the number;

(ii) calculating the corresponding tolerance of a new numerical value in accordance with said conversion formulae; and (iii) rounding the new value to the largest digit for which the rounding error is smaller than the calculated tolerance.

15. In a text processing system, including at least a central processor, a keyboard, a display and a memory wherein is stored:

(a) a list of symbols that represent chemical elements;

(b) rules for determining whether or not a combination of symbols listed in (a) is to be interpreted as a chemical formula; and (c) construction rules for allowable notations of formulae for chemical substances;

a method for checking the correct and consistent use of chemical formulae in a document, comprising the steps of:

(1) searching said document for chemical formulae, using the rules in (b) and the list in (a);

(2) checking the chemical formula from steps (1) with the construction rules in (c); and (3) generating an error signal if the construction rules are not satisfied.

16. A method for checking the correct and consistent use of chemical formulae of claim 15, wherein the memory includes a list of chemical names as well as rules for identifying chemical formulae that belong to said chemical names, the method comprising the steps of:

(i) searching the textual environment of the chemical name when said chemical formula is found in step 1; and (ii) when a chemical name is found, checking whether the formula belongs to this name.

17. A text processing means for checking the correct and consistent use of units in a given text, each of the units having a dimension to describe a quantity, comprising:

(a) a memory for storing symbols or a set rules that represent units and for storing criteria that define whether or not a symbol or a combination of symbols is to be interpreted as a unit, and for storing specified allowable units and allowable notations thereof;

(b) a keyboard for generating and entering data;

(c) a processor connected to the memory and the keyboard for:

(i) searching the text for strings that include any of the stored symbols which are capable of being interpreted as a unit or part of a unit pursuant to the stored criteria; and (ii) comparing, if such a string is found, the unit associated with the found string and the complete notation thereof to the units and notations specified as allowable units and allowable notations thereof; and (d) an error signal generating means for generating an error signal if the unit associated with the found string or the notation thereof is not allowable.

18. A text processing means for checking the correct and consistent use of units in a given text according to claim 17, wherein the processor includes means for executing a test to determine whether either a reference to a number or a keyword or symbol that refers to a magnitude is found in a predetermined environment of the string based on said criteria stored in the memory.

19. A text processing means for checking the correct and consistent use of units in a given text according to claim 17 or 18, wherein the processor includes means for analyzing the syntactical structure of said text based on features of typical syntactical structures in which the units appear.

20. A text processing means for checking the correct and consistent use of units in a given text according to claim 17 or 18, wherein the processor includes means for constructing possible mathematical expressions that can be composed of such symbols based on the stored construction rules and the list of symbols for allowable units.

21. A text processing means for checking the correct and consistent use of units in a given text according to claim 20, wherein the processor comprises means for calculating a dimension for each unit found in said text, comparison means for comparing that dimension with the dimension of the magnitude that is indicated by a symbol or keyword to which the unit is related in said text, and means responsive to this comparison for judging whether a unit corresponds to an allowable unit or not.

22. A text processing means for checking the correct and consistent use of chemical formulae in a document, comprising:

(a) a memory for storing data including symbols that represent chemical elements and rules for determining whether or not a combination of said symbols is interpreted as a chemical formula and for storing construction rules for allowable notations for formulae for chemical substances;

(b) a keyboard for generating and entering data;

(c) a processor connected to said memory and the keyboard for:
   (i) searching said document for chemical formulae based on the stored data including the symbols and the rules for determining whether or not a combination of said symbols is interpreted as a chemical unit; and
   (ii) checking the constructing rules if a chemical formula is found; and (d) an error generating means for generating an error signal if the construction rules are not fulfilled.

* * * * *